United States Patent [19]

Wong et al.

[11] Patent Number: 5,433,970

[45] Date of Patent: Jul. 18, 1995

[54] PROCESS FOR MAKING HIGH PROTEIN AND/OR REDUCED FAT NUT SPREADS AND PRODUCT THEREOF WHICH HAVE DESIRABLE FLUIDITY, TEXTURE AND FLAVOR

[75] Inventors: Vincent Y. L. Wong, Hamilton; Mark D. Theurer, Cincinnati, both of Ohio

[73] Assignee: The Procter & Gamble Company, Cincinnati, Ohio

[21] Appl. No.: 136,524

[22] Filed: Oct. 14, 1993

[51] Int. Cl.$^6$ .................................................. A23L 1/38
[52] U.S. Cl. .................................... 426/633; 426/518; 426/519
[58] Field of Search ........................ 426/633, 518, 519

[56] References Cited

U.S. PATENT DOCUMENTS

| | | | |
|---|---|---|---|
| 2,397,564 | 4/1946 | Rosenfield et al. | 426/633 |
| 3,317,325 | 5/1967 | Durst | 99/126 |
| 3,619,207 | 11/1971 | Dzurik et al. | 99/128 |
| 4,000,322 | 12/1976 | Billerbeck et al. | 426/72 |
| 4,004,037 | 1/1977 | Connick | 426/324 |
| 4,273,795 | 6/1981 | Bosco et al. | 426/602 |
| 4,329,375 | 5/1982 | Holloway, Jr. et al. | 426/632 |
| 4,814,195 | 3/1989 | Yokoyama et al. | 426/633 |
| 4,828,868 | 5/1989 | Lasdon et al. | 426/633 |
| 5,079,027 | 1/1992 | Wong et al. | 426/633 |
| 5,230,919 | 7/1993 | Walling et al. | 426/633 |

*Primary Examiner*—Helen Pratt
*Attorney, Agent, or Firm*—Tara M. Rosnell

[57] ABSTRACT

A process for preparing a high protein or low fat nut spread having desirable fluidity, texture and flavor. The process comprises as a first step depositing a nut paste in a mixing tank. Next, the solid ingredients which are to be present in the final product spread are mixed into the tank containing the peanut paste. The Casson plastic viscosity of the mixture is adjusted to about 30 poise or less. This mixture is then pumped through a homogenizer and a colloid mill or series of colloid mills. Nut spreads having a bimodal particle size distribution such that at least 50% of the solids in the nut spread have a particle size of less than 18 microns and 90% of the solids in the nut spread have a particle size of less than 60 microns, and further having a Casson plastic viscosity of from about 8 to about 17 poise and a yield value of less than about 300 dynes per square centimeter are produced according to this process.

19 Claims, No Drawings

PROCESS FOR MAKING HIGH PROTEIN AND/OR REDUCED FAT NUT SPREADS AND PRODUCT THEREOF WHICH HAVE DESIRABLE FLUIDITY, TEXTURE AND FLAVOR

FIELD OF THE INVENTION

The present invention relates to a process for adding solids to peanut paste that results in a fluid, nongritty nut spread having superior peanut flavor. Reduced fat peanut spreads having desirable fluidity and smooth texture can be prepared according to the process of the present invention.

BACKGROUND OF THE INVENTION

Conventional peanut and other nut butters or spreads consist of a mixture of solid nut particles, liquid oil, flavorants, e.g., a sweetener such as sugar, high fructose corn syrup or honey, and salt, and a stabilizer. Peanut butters typically contain about 50% oil and about 50% solids. Peanut butters containing these levels of solids and oil have good texture, spreadability and flavor.

For some applications, however, it is desirable to have a peanut spread which contains higher levels of solids. This may be the case, for example, when a high protein and/or reduced fat nut spread is desired. High protein and/or reduced fat nut spreads are typically prepared by increasing the level of solids ingredients present in the final product relative to the level of oil. Reduced fat peanut spreads, for example, typically comprise from about 58% to about 75% solids and from about 25% to about 42% oil.

Unfortunately, increasing the level of solids in the nut spread relative to the level of oil can have deleterious affects on the quality of the nut spread. For example, increasing the level of solids in a nut spread can increase the viscosity of the spread such that the spread is undesirably stiff (e.g., nonfluid). Indeed, spreadability or fluidity is highly sensitive to the oil content of the nut spread; the lower the; oil content, the harder the product is to spread. The addition of non-nut solids also reduces the fluidity of the nut spread by creating a trimodal particle size distribution for the finished nut spread (reduced fat nut spreads desirably have a monomodal or bimodal particle size distribution). Increasing the level of solids in a nut spread relative to the level of oil can also adversely impact the texture of the nut spread. The solid particles create an undesirable sensation of grittiness upon mastication of the nut spread. Lastly, increasing the level of solids in a nut spread can adversely affect the flavor of the nut spread by diluting the peanut flavor.

Past attempts to provide nut spreads which have the combination of desirable fluidity, smooth texture and desirable flavor but which contain a high level of solids (e.g., greater than about 58%) have not been wholly successful. Efforts to reduce grittiness have resulted in a high viscosity spread. Moreover, attempts to reduce viscosity have resulted in nut spreads with less flavor compared to full fat peanut butters. A process taught by Wong et al. utilized a roll milling operation to prepare defatted peanut solids for use in a low fat peanut spread. See U.S. Pat. No. 5,079,027 issued Jan. 7, 1992. Another process taught by Walling et al utilizes extrusion roasting or a combination of roll milling and high shear mixing to prepare defatted peanut solids to be combined with undefatted peanuts in the preparation of a low fat peanut spread. See U.S. Pat. No. 5,230,919 issued Jul. 27, 1993. The use of defatted peanuts and intense processing conditions in these processes resulted in peanut spreads with inferior flavor compared to full fat peanut butters. Moreover, the roll milling and extrusion roasting processes taught by Wong et al. and Walling et al. are relatively capital intensive for a peanut manufacturing operation.

It is therefore an object of the present invention to provide a process for preparing high protein and/or reduced fat nut spreads which have desirable texture (e.g., are not gritty) and fluidity and which have a nut flavor comparable to that of conventional full fat nut butters.

SUMMARY OF THE INVENTION

The present invention relates to a process for preparing a high protein or low fat nut spread having desirable fluidity, texture and flavor. The process comprises as a first step depositing a nut paste in a mixing tank (step a). Next, the solid ingredients which are to be present in the final product spread are mixed into the tank containing the peanut paste and the Casson plastic viscosity of the mixture is adjusted to about 30 poise or less (step b). This mixture is then pumped through a homogenizer (step c) and a colloid mill or series of colloid mills (step d). Steps c and/or d are then repeated as necessary to provide a nut spread having a bimodal particle size distribution such that at least 50% of the solids in the nut spread have a particle size of less than 18 microns and 90% of the solids in the nut spread have a particle size of less than 60 microns, a Casson plastic viscosity of from about 8 to about 17 poise and a Casson yield value of less than about 300 dynes per square centimeter.

DETAILED DESCRIPTION OF THE INVENTION

The present invention relates to a process for preparing high protein and/or low fat nut spreads having desirable fluidity, texture and flavor. The term "nut spread" as used herein means a spreadable food product made from nut solids and oil. Nut spreads typically contain from about 58% to about 75% solids and from about 25% to about 42% oil or fat. The remainder of the nut spread comprises additives such as sweeteners, stabilizers, flavoring agents, proteins and non-nutritive bulking agents. The process of the present invention is particularly suitable for preparing low fat (25% to 42% total fat) peanut spreads The materials used in the process of the present invention, the steps of the process, and products prepared according to the process are described in detail as follows:

I. Process Materials

The materials used in the process of the present invention include nut paste and solid ingredients, as well as other optional ingredients.

A. Nut paste

The process of the present invention utilizes a nut paste, preferably peanut paste, as a starting material. While this invention will be generally described in terms of peanuts and peanut paste, it should be readily apparent that other materials such as almonds, pecans, walnuts, cashews, filberts, macadamia nuts, brazilians, sunflower seeds, sesame seeds, pumpkin seeds and soybeans could be used to form the nut paste utilized in the process of the present invention. The term "nut" as used herein encompasses these nuts and seeds. Mixtures of these nuts and oil seeds can also be used.

The nut paste can be formed by any of a number of known methods. For example, the nuts can be roasted and then ground in a conventional grinder or mill such as a Bauer mill to produce a nut paste of pumpable consistency. The nut paste may optionally be defatted or the particle size of the nut solids of the nut paste may be reduced. See, for example Wong et al.; U.S. Pat. No. 5,097,027; Issued Jan. 7, 1992, herein incorporated by reference.

The nut paste will typically comprise from about 50% to about 90% of the nut spread. Preferably, the nut paste will comprise form about 50% to about 85% of the nut spread. More preferably, the nut paste will comprise from about 55% to about 65% of the nut spread. Nut spread containing these levels of nut paste will generally comprise from about 25% to about 42%, preferably from about 30% to about 40%, more preferably from about 30% to about 35% total fat.

B. Solid ingredients

The process of the present invention also utilizes solid ingredients as a starting material. The solid ingredients used to prepare fluid, nongritty, nut spreads by the process of this invention can include, for example; diluents such as corn syrup solids, maltodextrin, dextrose, polydextrose, fiber, mono- and disaccharides, starches (e.g., corn, potato, wheat)and flours (e.g., wheat, rye, pea); protein supplements such as additional peanut solids, soy flour, soy concentrate, soy isolate, casein, egg whites, and protein from other animal or vegetable sources; or a combination of the above.

The solid ingredients which are added to the nut paste typically comprise from about 13% to about 50% of the nut spread. Preferably, the solid ingredients comprise from about 38% to about 45% of the nut spread. More preferably, the solid ingredients comprise form about 32% to about 43% of the nut spread.

C. Other Optional Ingredients

In addition to the nut paste and the solid ingredients described hereinabove, the process of the present invention may optionally utilize other ingredients. For example, low calorie oils and zero calorie oils such as sucrose polyesters of long chain fatty acids (olestra) and other polyol polyesters of fatty acids can be used (see for example U.S. Pat. Nos. 3,600,186 to Mattson, et al. and 4,005,196 to Jandacek). Mixed triglycerides made from medium and long chain saturated and/or unsaturated fatty acids can also be used herein. An oil which contains at least 10% medium chain triglycerides can also be used. Medium chain triglycerides contain saturated fatty acids having from six to twelve carbon atoms. Reduced calorie peanut butters containing medium chain triglycerides are described in U.S. Pat. No. 4,863,753 (Hunter, et al., 1989).

The nut spread prepared according to the process of the present invention may also optionally contain a stabilizer. The stabilizer can be any of the known peanut butter stabilizers, for example, hydrogenated rapeseed oil, or other hydrogenated triglycerides having a high proportion of $C_{20}$ and $C_{22}$ fatty acids. (See for example, U.S. Pat. No. 3,597,230 and U.S. Pat. No. 3,192,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, cottonseed oil, coconut oil, and similar materials. This stabilizer can also be mixed with lower melting fat fractions as, for example, the peanut butter stabilizer composition disclosed in U.S. Pat. No. 4,341,814 (1982).

In addition to the stabilizer, or in lieu thereof, an emulsifier can be used in the process of the present invention. The emulsifier can be any food compatible emulsifier such as mono- and di-glycerides, lecithin, sucrose monoesters, polyglycerol esters, sorbitan esters, polyethoxylated glycerols and mixtures thereof. Up to about 3% and preferably from 1% to 3% stabilizer or emulsifier is used.

The process described herein can also optionally utilize flavorants. "Flavorants," as the term is used herein, are agents which contribute to or enhance the flavor of the nut butter. These include sweeteners, flavor enhancers, artificial sweeteners, natural and artificial flavors, flavored or candied bits, nut chunks and other additives which contribute to the flavor of the spread. Sweeteners are selected from the group consisting of sugars, sugar mixtures, artificial sweeteners and other naturally sweet materials. Sugars include, for example, sucrose, fructose, dextrose, honey, molasses, high fructose corn syrup, lactose, maltose, and maltose syrups. Preferably, the sweetener will be something which has a sweetness intensity about that of sucrose or fructose. Sweeteners are generally added at a level of 0% to about 8%; preferably from about 1% to about 6%.

Artificial sweeteners such as aspartame, acesulfam, saccharine, cyclamate, and glycyrrhizin can also be used. The amount of artificial sweetener used would be that effective to produce the sweetness that is desired; and would be about the equivalent of the addition of from about 1% to 7% of sucrose.

Flavor enhancers including salt or salt substitutes such as potassium chloride, sodium chloride/potassium chloride mixtures, and seasoned salts can also be used. The level of flavor enhancer used is a matter of the desired taste level, but usually is from about 0.1% to about 2%. Other flavorants include natural or artificial peanut flavors, roasted flavors, and praline/caramel flavors, walnut flavors, almond flavors and flavor compositions.

The process of the present invention can also employ nut chunks, and other flavored additives which can be mixed with the peanut spread. These additives include chocolate chips or bits or other flavored bits, e.g. butterscotch and peanuts, jellies, (either low calorie jellies or regular jelly or preserves), and praline nuts or other candies. These additives are usually added at a level of from about 1% to about 20% by weight. Nut chunks and flavored bits can contain fats and oils. Therefore, the addition of these materials can affect the fat content and the calorie level of the nut spread.

II. Process steps

The process of the present invention involves as a first step depositing the hereinbefore described peanut paste into a mixing tank. Next, the solid ingredients are added to the mixing tank containing the peanut paste. The solids may be added gradually or all at once. As the solid ingredients are added to the peanut paste, however, the viscosity of the mixture of peanut paste and solids in the mixing tank will increase. In order to provide a fluid peanut spread as described herein, it is critical to provide a mixture having a viscosity of 30 poise or less, preferably 25 poise or less, more preferably 20 poise or less and most preferably 15 poise or less at this point in the process. This critical viscosity for the mixture can be achieved in a number of ways, including, for example, by controlling the rate at which the solid ingredients are added, by generating a recycled product stream, or by pumping the mixture through a colloid mill or series of colloid mills. Once the desired viscosity for the mixture is realized, the mixture is pumped through a homogenizer and then a colloid mill or series of colloid mills. Some or all of these steps are then repeated as necessary to produce a peanut spread having the desired characteristics. In particular, nut spreads will have a bimodal particle distribution such that at least 50% of the solids in the nut spread have a particle size of less than about 18 microns and at least 90% of the solids in the nut spread have a particle size of less than about 60 microns. Nut spreads prepared according to the process of the present invention will further have a Casson plastic viscosity of from about 8 to about 17 poise and a Casson yield value of less than about 300 dynes/cm2. The process of the present invention may be a batch process, a multi-batch process or a continuous process.

Each of the basic steps of the process of the present invention is described in detail as follows:

A. Depositing the peanut paste into mixing tank

As a first process step, the hereinbefore described peanut paste is deposited into a mixing tank such as a Hamilton kettle. The peanut paste is then mixed as the solid ingredients are added as described hereinafter in step (B).

B. Mixing the solid ingredients into the mixing tank containing the peanut paste and adjusting the Casson plastic viscosity of the mixture to about 30 poise or less In a second process step, the solid ingredients are added to the mixing tank containing the peanut paste. The solid ingredients may be added gradually or all at once. As the solid ingredients are added to the peanut paste, however, the viscosity of the mixture of peanut paste and solid ingredients will increase. However, in order to produce a fluid, nongritty peanut spread product having superior flavor as described herein it is critical that the mixture have a Casson plastic viscosity of 30 poise or less before the mixture is pumped through the homogenizer as described in step (c) below.

One way to control the viscosity of the mixture is control the rate at which the solid ingredients are added to the peanut paste. In a batch process for example, the solids are typically added gradually over a period of time typically ranging from about 25 to about 75 minutes, preferably from about 40 to about 60 minutes. The flow of the solid ingredients being added to the peanut paste in a batch process, although generally constant, may be speeded up or slowed down as necessary so that the critical viscosity for the mixture to be pumped through the homogenizer is not exceeded. Alternatively, the solid ingredients may be added to the peanut paste sequentially in discrete amounts, as in a multi-batch process. In either a batch or multi-batch process, however, due to the continual increasing in the viscosity of the mixture as the solid ingredients are added, only a portion of the solids can be added to the per,nut paste before the critical viscosity is reached. Once this critical viscosity is reached, no more solids can be added before proceeding to step (c) below unless the viscosity of the mixture is reduced.

There are a number of ways of reducing the viscosity of a mixture of solids and peanut paste after enough solids have been added to the peanut paste such that the viscosity of the mixture of solids and peanut paste has reached or exceeded the critical viscosity. For example in a batch process, the viscosity of the mixture can be lowered by generating a recycled product stream having a lower viscosity than the tank mixture and depositing this recycled product stream into the mixing tank.

To generate such a product stream, a portion of the mixture containing the peanut paste and the solid ingredients that have been added up to the point that the critical viscosity is reached can be pumped through a homogenizer and a colloid mill or series of colloid mills in a manner similar to that described hereinafter in steps (c) and (d). The homogenized, colloid milled product stream will have a lower viscosity than the mixture of peanut paste and solid ingredients already in the tank and can be deposited into the mixing tank to lower the viscosity of the tank mixture. Typically, the recycled product stream will have a viscosity of less than about 35 poise, more typically less than about 30 poise, most typically less than about 20 poise. Typically at least 50% of the solids in the recycled product stream will have a particle size of less than 18 microns, more typically less than 15 microns, and most typically less than 13 microns, and at least 90% of the solids in the recycled product stream will have a particle size of less than 60 microns, preferably less than 52 microns, more preferably less than 40 microns. Once the viscosity of the tank mixture has been lowered sufficiently, more solid ingredients can be added. This can then be repeated until all of the solids have been added.

Another way of reducing the viscosity of a mixture that has reached or exceeded the critical viscosity is to pass the mixture through a colloid mill. For example, in a multi-batch process a discrete amount of the solid ingredients which are to be present in the nut spread product is added to the peanut paste all at once (e.g., ⅓ of the solid ingredients). Then, if the viscosity of the mixture of peanut paste and solids exceed the critical viscosity, the mixture can be colloid milled to reduce the viscosity of the mixture. Once the viscosity has been reduced to an acceptable level, the mixture can be pumped through a homogenizer and a colloid mill in a manner similar to that described hereinafter in step (c). At that point, another portion of the solid ingredients can be added to the mixture and the process repeated until all of the solids have been added.

The use of a colloid mill to reduce the viscosity of a mixture to below the critical viscosity described herein can also be employed in a continuous process. In a continuous process, all of the solid ingredients are added at once. The mixture containing all of the solid ingredients will generally have a viscosity in excess of the critical viscosity defined herein. The viscosity of the mixture can be reduced to within acceptable levels, however, by pumping the mixture through a colloid mill or a series of colloid mills.

C. Pumping the mixture containing the peanut paste and the solid ingredients through a homogenizer After all the solid ingredients have been added to the peanut paste and the Casson plastic viscosity of the mixture has been adjusted to a level of about 30 poise or less as described in step (b) hereinabove, the mixture is pumped through a homogenizer, such as the homogenizer described at pages 1167–1168 of Perry's *Chemical*

*Engineers Handbook* (3rd Edition). The purpose of the homogenizer is to break down the particle size of the solids so that the solids will not impart an undesirable sensation of grittiness to the nut spread upon mastication. The mixture is homogenized by known methods (See, for example, U.S. Pat. No. 3,619,207; Issued Nov. 9, 1971.) The operating conditions of the homogenizer should be selected so that after homogenization at least about 50% of the solids have a particle size of less than about 18 microns, preferably less than 15 microns, more preferably less than 13 microns and at least about 90% of the solids have a particle size of less than about 60 microns, preferably less than about 52 microns, more preferably less than about 40 microns. Nut spreads in which at least 90% of the solids have a particle size of less than 60 microns will have a smooth texture (e.g., they will not be gritty). To achieve this reduction is particle size, the homogenizer is typically operated at from about 4000 to about 8000 psig, preferably from about 5000 to about 8000 psig, more preferably from about 6000 to about 7000 psig. A cell disruption valve can optionally be used to achieve a higher particle size breakdown at lower pressures.

After homogenization, the viscosity of the mixture will be significantly higher than before homogenization due to the increase in particle surface area as a result of particle size reduction. This increase in the viscosity of the mixture after homogenization is in contrast to what is observed for conventional full fat peanut butters. When a mixture containing solid ingredients and peanut paste in the proportions in which they are typically present in a full fat peanut butter is passed through a homogenizer under the conditions described herein, the viscosity of the mixture decreases. Thus, the increase in the viscosity of the mixture of peanut paste and solid ingredients in the proportions described herein after homogenization is unexpected. Such an increase in viscosity as a result of homogenization would normally be considered undesirable. However, it has surprisingly been found that when the homogenized mixture is passed through a colloid mill, as described in step (d) hereinbelow, the result is to decrease the viscosity of the mixture to lower than it was before the mixture was homogenized.

A heat exchanger may optionally be used after the homogenizer to cool the mixture before it reaches the colloid mill. Use of a heat exchanger can prevent flavor degradation and help to increase the efficiency of the colloid mill.

D. Pumping the homogenized mixture through a colloid mill or series of colloid mills to provide a peanut spread having a bimodal particle size distribution, a Casson plastic viscosity of from about 8 to about 17 poise and a yield value of less than about 300 dynes per square centimeter Next, the homogenized mixture is pumped through a colloid mill or series of colloid mills to reduced the viscosity of the mixture. The operating conditions of the colloid mill are selected so that the viscosity of the nut spread product ranges from about 8 to about 17 poise, preferably from about 8 to about 15 poise, more preferably from about 8 to about 12 poise. Typically, the colloid mill is operated with a wide open gap at about 3600 rpm. In order to provide a nut spread having the characteristics described hereinafter, it may be necessary to pass the homogenized mixture through more than one colloid mill. Typically, the mixture is passed through the colloid mill from 1 to 6 times, more typically from 1 to 3 times. A heat exchanger may optionally be used between the colloid mills.

The finished nut spread product will have a plastic viscosity of from about 8 to about 17 poise, preferably from about 8 poise to about 15 poise, more preferably from about 8 poise to about 12 poise. The product will further have a yield value of less than about 300 dynes per square centimeter, preferably less than about 250 dynes per square centimeter, more preferably less than about 225 dynes per square centimeter. The particle size distribution of the product is bi-modal. Preferably at least 50% of the solids in the nut spread have a particle size of less than 18 microns, preferably less than 15 microns, most preferably less than 13 microns and at least 90% of the solids have a particle size of less than 60 microns, preferably less than 52 microns, more preferably less than 40 microns. Such a nut spread product is fluid and has desirable texture (e.g., is not gritty) and flavor.

ANALYTICAL TEST METHODS

A number of parameters used to characterize elements of the present invention are quantified by particular experimental analytical procedures. Each of these procedures is described in detail as follows:

1. Casson Plastic Viscosity and Casson Yield Value and Nut Spread

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. and all samples are measured at 65° C.

A sample of 14.0 grams of nut spread (unaerated) is placed in the sample cell. The sample cell is then inserted in the jacketed cell holder. To compensate for heat losses through the tubings, etc., the water temperature entering the jacketed cell holder should be a few degrees higher than the desired sample temperature of 65° C. After the temperature of the sample has reached 65° C. the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE 1

| RPM | Time Before Reading (Seconds) |
|---|---|
| 100 | 3 |
| 50 | 6 |
| 20 | 15 |
| 10 | 30 |
| 5 | 60 |

The dial reading and rpm are converted into shear stress and shear rate values by multiplying the rpm and dial reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the nut spread's viscosity at an infinite shear rate. It accurately predicts the resistance to flow in pumping, moving or mixing situations. The Casson plastic viscosity is measured in poise.

The second value is the yield value which is equal to the value of the x intercept (abscissa) squared. The yield value is a measure of amount of force or shear that is necessary to get the nut spread to start moving. The yield value is measured in dynes per square centimeter. The relationship between the plastic viscosity and the yield value determine how a nut spread will behave in additional processing.

2. Particle Size Analysis

A Malvern 2600D particle size analyzer with a PS/2 computer was used to analyze the particle size of the samples. A small amount (about 0.01 grams) of its sample was placed in a 25 ml test tube and about 15 ml of acetone are added to it. The sample is dispersed in the acetone by using a vortex mixer. A transfer pipette is then used to add this diluted solution dropwise to the acetone filled cell of the analyzer. The sample is added until the obscuration is 0.2 to 0.3. The obscuration refers to the amount of light which is obscured by the sample because of diffraction and absorption. The instrument reads more accurately when the obscuration is 0.05 to 0.5 and preferably from 0.2 to 0.3 (20% to 30% of the light energy is reduced).

The apparatus is fitted with a 100 mm lens to determine the particle size of the paste. Particle sizes from 0.5 to 188 microns can be measured using a 100 mm lens. A magnetic stirrer is used to insure that the sample is being dispersed during the readings. Each sample is swept 250 times by the laser for each reading. Each sample was read a minimum of three times with a five (5) minute wait between each reading.

EXAMPLES

Example I

Example I describes a reduced fat peanut spread prepared by a 400 lb. batch process. The ingredients used to prepare this peanut spread are as follows:

| Ingredient | % |
|---|---|
| Peanuts | 61.0 |
| Sugar | 6.4 |
| Salt | 1.6 |
| Molasses | 0.5 |
| CBC Stabilizer | 1.25 |
| 20631 Emulsifier | 0.7 |
| Soy Protein Isolate | 5.0 |
| Corn Syrup Solids | 23.42 |
| Vitamins/Minerals | 0.14 |

The peanuts are roasted at 422° F. and blanched and ground in a Bauer Mill to form a peanut paste. 244 pounds of peanut paste is then deposited into a 100 gallon Hamilton kettle. The molasses, stabilizer, and emulsifier are added to the mixing tank which is held at a constant temperature of 140° F.

145.7 pounds of solid ingredients (soy protein isolate, corn syrup solids, salt and sugar), are weighed into a Hobart Mixing Bowl. The solids are mixed at low speed for about 15 minutes and then loaded into a K-Tron T-35 Twin Screw feeder positioned over the mixing tank.

The solids are then added to the mixing tank at a constant rate over a time period of about 70 minutes (feed rate of 120 lbs/hour). Throughout the time that the solids are being added to the peanut paste in the mixing tank, a portion of the tank mixture is pumped through a Gaulin M-3 Homogenizer at 7,000 psig, into a heat exchanger, and then into a Greerco W-500 H Colloid Mill. At least 50% of the solids in the homogenized, colloid milled product stream have a particle size of less than 12.7 microns and at least 90% of the solids in the product stream have a particle size of less than 54.4 microns. This product stream is deposited into the mixing tank.

When all of the solid ingredients have been added to the mixing tank containing the peanut paste/solids mixture, the mixture has a Casson plastic viscosity of 19.1 poise. This mixture is pumped through the homogenizer, heat exchanger and colloid mill for another 110 minutes. The vitamins and minerals are then added to the mixture. The finished nut spread has a Casson plastic viscosity of about 13.5 poise and a yield value of 197 dynes per square centimeter. The particle size distribution is near monomodal. At least 50% of the solids in the nut spread have a particles size of less than 9.6 microns and at least 90% of the solids have a particle size of less than 38.6 microns. This nut spread is fluid and has a smooth (nongritty texture) and desirable flavor. The fat content of the nut spread is 34%.

Example II

A reduced fat nut spread is prepared according to the process described hereinabove in Example I, except that the homogenizer is operated at a pressure of 4000 psig. The homogenized, colloid milled mixture of this Example II has a bimodal particle size distribution. At least about 50% of the solids in the homogenized, colloid milled mixture have a particle size of less than 12.2 microns and at least 90% of the solids have a particle size of less than 55.2. When all of the solids have been added to the mixing tank containing the peanut paste/solids mixture, the mixture has a Casson plastic viscosity of 17.7 poise. This mixture is pumped through the homogenizer, heat exchanger and colloid mill for another 110 minutes. The finished nut spread has a Casson plastic viscosity of about 10.1 poise, a yield value of 172 dynes per square centimeter and a bimodal particle size distribution. About 50% of the solids present in the nut spread have a particle size of less than 12.3 microns and about 90% of the solids in the nut spread have a particle size of less than 55.9 microns. This nut spread is fluid and has a smooth (nongritty texture) and desirable flavor. The fat content of the nut spread is 34%.

Example III

A reduced fat nut spread is prepared according to the process described hereinabove in Example I, except that when all of the solids have been added the mixture is passed through the homgenizer and heat exchanger once and the colloid mill twice rather than continuously pumped through the homogenizer, heat exchanger and colloid mill for 110 minutes. When all of the solids have been added to the mixture the Casson plastic viscosity of the mixture is 29.6 poise. The finished nut spread has a Casson plastic viscosity of about 12.4 poise, a yield value of 228 dynes per square centimeter and a bimodal particle size distribution. About 50% of the solids present in the nut spread have a particle size of less than 11.3 microns and about 90% of the solids in the nut spread have a particle size of less than about 44.9 microns. This nut spread is fluid and has smooth (nongritty texture) and desirable flavor. The fat content of the nut spread is 34%.

Example IV

Example IV describes a reduced fat nut spread prepared by a continuous process. The ingredients described hereinbefore in Example I are used to prepare the reduced fat peanut spread of this Example IV, except that only ⅔ of the dry ingredients are used. Peanuts are roasted at 422° F. and blanched and ground to a pumpable consistency in a Bauer Mill to form a peanut paste. The peanut paste is then deposited into a mixing tank (100 gallon Hamilton kettle). The molasses, stabilizer, and emulsifier are added to the mixing tank which is held at a constant temperature of 140° F.

The solid ingredients (soy protein isolate and corn syrup solids) are weighed into a Hobart Mixing Bowl. The solids are mixed at low speed for about 15 minutes and then loaded into a K-Tron T-35 Twin Screw feeder positioned over the mixing tank.

The solid ingredients are then added to the mixing tank containing the peanut palate all at once. The peanut paste and solid ingredients are mixed at a rate of 17 rpm for about 30 minutes. The mixture is then passed through a series of six colloid mills. At this point the mixture has a Casson plastic viscosity of about 15.9 poise. At least 50% of the solids in the mixture at this point have a particle size of 18 microns or less and at least 90% of the solids have a particle size of 65.2 microns or less.

The colloid milled mixture is then pumped through a Gaulin M-3 Homogenizer at 7000 psig, into a heat exchanger and then through three Greerco W-500 H Colloid Mills set up in series. The vitamins and minerals are then added to the mixture. The finished nut spread has a Casson plastic viscosity of about 10.6 poise, a yield value of about 112 dynes per square centimeter and a bimodal particle size distribution. About 50% of the solids in the nut spread have a particle size of less than 12.6 microns and about 90% of the solids in the nut spread have a particle size of less than about 48.7 microns. This nut spread is fluid and has a smooth (nongritty) texture and desirable flavor. The nut spread has a total fat content of about 39%.

Example V

Example V describes a reduced fat nut spread prepared by a continuous process. The nut spreads are prepared according to the process described in Example IV hereinabove, except that only 50% of the solid ingredients described in Example I are used. The mixture of nut paste and solid ingredients has a Casson plastic viscosity of about 13.6 poise before entering the homogenizer and has a bimodal particle size distribution. At least about 50% of the solids in the mixture at this point have a particle size of less than about 15.2 microns and at least about 90% have a particle size of less than about 47.2 microns.

The finished nut spread has a Casson plastic viscosity of about 9.8 poise, a yield value of about 103 dynes per square centimeter and a bimodal particle size distribution. About 50% of the solids in the nut spread have a particle size of less than 11.3 microns and about 90% of the solids in the nut spread have a particle size of less than about 41.7 microns. This nut spread is fluid and has a smooth (nongritty) texture and desirable flavor. The nut spread has a total fat content of about 42%.

Example VI

Example VI describes a reduced fat nut spread prepared by a continuous process. The nut spreads are prepared according to the process described in Example IV hereinabove, except that only ⅓ of the solid ingredients described in Example I are used. The mixture of nut paste and solid ingredients has a Casson plastic viscosity of about 10.6 poise before entering the homogenizer and has a bimodal particle size distribution. At least about 50% of the solids in the mixture at this point have a particle size of less than about 15.8 microns and at least about 90% have a particle size of less than about 51.2 microns.

The finished nut spread has a Casson plastic viscosity of about 8.7 poise, a yield value of about 86 dynes per square centimeter and a bimodal particle size distribution. About 50% of the solids in the nut spread have a particle size of less than 11.4 microns and about 90% of the solids in the nut spread have a particle size of less than about 42.7 microns. This nut spread is fluid and has a smooth (nongritty) texture and desirable flavor. The nut spread has a total fat content of about 45%.

What is claimed is:

1. A process for preparing a high protein and/or a low fat nut spread having desirable fluidity, texture and flavor, comprising:
   a) from about 50% to about 90% of a nut paste;
   b) from about 13% to about 50% of solid diluents selected from the group consisting of corn syrup solids, maltodextrin, dextrose, polydextrose, fiber, mono-and dissacharides, starches, flours, protein supplements, protein from animal or vegetable sources and a mixture thereof;
   c) from 0% to about 3% stabilizer;
   d) from 0% to about 3% emulsifier; and
   e) from 0% to about 8% flavorants;
   wherein the process comprises the steps of:
   a) depositing the nut paste in a mixing tank;
   b) mixing the solid ingredients into the nut paste to form a mixture and adjusting the Casson plastic viscosity of the mixture to about 30 poise or less;
   c) pumping the mixture through a homogenizer;
   d) pumping the mixture through a colloid mill; and
   e) repeating steps (c) and/or (d) as necessary to provide a nut spread having a bimodal particle size distribution such that at least 50% of the solids have a particle size of less than 18 microns and 90% of the solids have a particle size of less than 60 microns, and further having a Casson plastic viscosity of from about 8 to about 17 poise; a yield value of less than about 300 dynes per square centimeter and a fat content ranging from about 25% to about 42%.

2. A process according to claim 1 wherein the nut spread is a reduced fat nut spread having a fat content of from about 33% to about 42%.

3. A process according to claim 2 wherein the homogenizer is operated at a pressure of from about 4000 to about 8000 psig.

4. A process according to claim 3 wherein the homogenized mixture of peanut paste and solids is pumped through a heat exchanger before being pumped through the colloid mill in step (d).

5. A process according to claim 4 which is a batch process.

6. A product prepared according to the process of claim 1.

7. A process for making a high protein and/or low fat nut spread having desirable fluidity, texture and flavor, comprising:
 a) from about 50% to about 90% of a nut paste;
 b) from about 13% to about 50% of solid diluents selected from the group consisting of corn syrup solids, maltodextrin, dextrose, polydextrose, fiber, mono-and dissacharides, starches, flours, protein supplements, protein from animal or vegetable sources and a mixture thereof;
 c) from 0% to about 3% stabilizer;
 d) from 0% to about 3% emulsifier; and
 e) from 0% to about 8% flavorants;
wherein the process comprises the steps of:
 a) depositing nut paste in a mixing tank;
 b) mixing solid ingredients into the nut paste to form a mixture at a rate such that the viscosity of the tank mixture does not exceed 30 poise;
 c) generating a recycled product stream having a lower viscosity than the tank mixture by pumping a portion of the tank mixture through a homogenizer and a colloid mill and depositing this recycled product stream into the mixing tank;
 d) continuing steps (b) and (c) until all of the solid ingredients have been added to the mixing tank; and
 e) pumping the tank mixture through the homogenizer and colloid mill at least one more time to produce a nut spread having a Casson plastic viscosity of from about 8 to about 17 poise, a yield value of less than about 300 dynes/cm2, a fat content ranging from about 25% to about 42% and a bimodal particle size distribution such that at least about 50% of the solids in the nut spread have a particle size of less than about 18 microns and at least 90% of the solids in the nut spread have a particle size of less than about 60 microns.

8. A process according to claim 7 wherein the recycled product stream has a Casson plastic viscosity of less than about 35 poise and wherein 50% of the solids in the product stream have a particle size of less than 18 microns and 90% of the solids in the product stream have a particle size of less than about 60 microns.

9. A process according to claim 8 wherein the mixture of peanut paste and solid ingredients is passed through a heat exchanger before being passed through the colloid mill in step (c).

10. A process according to claim 9 wherein the homogenizer is operated at a pressure of from about 4000 to about 8000 psig.

11. A process according to claim 10 wherein the nut spread is a reduced fat peanut spread having a fat content of from about 33% to about 42%.

12. A product prepared according to the process of claim 7.

13. A process for preparing a high protein and/or a low fat nut spread having desirable fluidity, texture and flavor, comprising:
 a) from about 50% to about 90% of a nut paste;
 b) from about 13% to about 50% of solid diluents selected from the group consisting of corn syrup solids, maltodextrin, dextrose, polydextrose, fiber, mono-and dissacharides, starches, flours, protein supplements, protein from animal or vegetable sources and a mixture thereof,
 c) from 0% to about 3% stabilizer;
 d) from 0% to about 3% emulsifier; and
 e) from 0% to about 8% flavorants;
wherein the process comprises the steps of:
 a) depositing nut paste in a mixing tank;
 b) mixing all of the solid ingredients into the nut paste to form a mixture;
 c) pumping the mixture through a colloid mill or series of colloid mills to produce a mixture having a Casson plastic viscosity of less than 30 poise;
 d) pumping the mixture through a homogenizer;
 e) pumping the mixture through a colloid mill or series of colloid mills to produce a nut spread having a bimodal particle size distribution such that at least 50% of the solids have a particle size of less than 18 microns and at least 90% of the solids have a particle size of less than 60 microns, and further having a Casson plastic viscosity of from about 8 to about 17 poise; a yield value of less than about 300 dynes per square centimeter and a fat content ranging from about 25% to about 42%.

14. A process according to claim 13 wherein the nut spread is a reduced fat nut spread having a fat content of from about 35% to about 45%.

15. A process according to claim 14 wherein the mixture produced in step (c) has a bimodal particle size distribution such that at least 50% of the solids have a particle size of less than about 18 microns and at least 90% of the solids have a particle size of less than about 60 microns.

16. A process according to claim 15 wherein in step (c) the mixture is passed through a series of from 1 to 6 colloid mills.

17. A process according to claim 16 wherein in step (e) the mixture is pumped through a series of from 1 to 3 colloid mills.

18. A process according to claim 17 wherein the mixture is passed through a heat exchanger before being passed through the colloid mill in step (e).

19. A product prepared according to the process of claim 13.

* * * * *